Dec. 22, 1936. W. W. DE LANEY ET AL 2,065,120
VALVE FOR INFLATABLE BALLS
Filed April 12, 1935
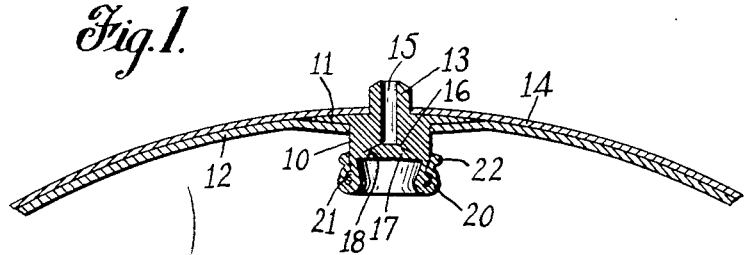
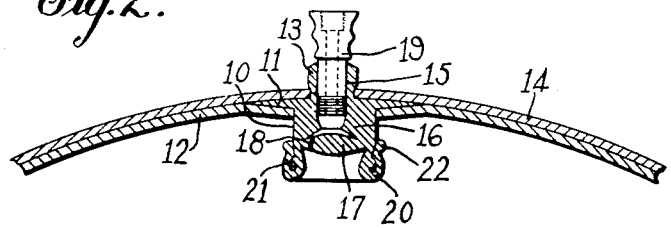
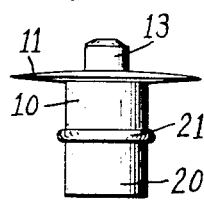
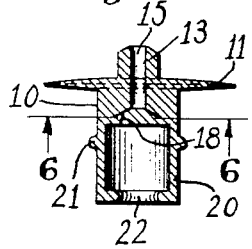
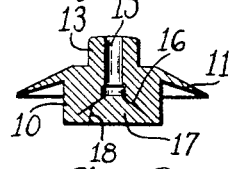
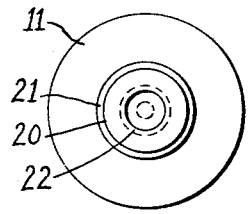
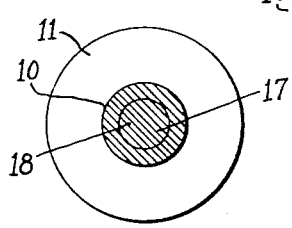
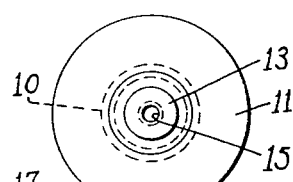
Inventors
Wallace W. De Laney
and Purl S. Madsen
By Rockwell & Bartholow
Attorneys Patented Dec. 22, 1936

2,065,120

UNITED STATES PATENT OFFICE 2,065,120

VALVE FOR INFLATABLE BALLS

Wallace W. De Laney, New Haven, and Paul S. Madsen, Bethany, Conn., assignors to The Seamless Rubber Company, Inc., New Haven, Conn., a corporation of Massachusetts Application April 12, 1935, Serial No. 16,042

7 Claims. (Cl. 273—65)

This invention relates to inflating valves for such articles as football bladders, play balls, and the like, and has particular reference to a self-closing valve of this character such that when the bladder or ball has been inflated, the valve will be self-closing to prevent the escape of the air within. Preferably the valve structure may be made entirely of rubber, although this is not essential in all aspects of the invention, but when so made can be manufactured very economically and at the same time will be efficient in operation.

In the manufacture of football bladders and the like, a valve of this character may be permanently attached to the bladder and be provided with an upwardly extending projection to extend through an opening in the cover of the ball so that the bladder may be readily inflated by the insertion of an inflating nozzle in the projecting end of the valve member without unlacing the cover.

One of the objects of the invention is the provision of a self-closing inflating valve for football bladders, play balls, or the like, which may be economically manufactured and at the same time be efficient in operation.

Another object of the invention is the provision of a self-closing valve for football bladders, play balls, or the like, which may be attached to the bladder or ball and when the inflation process has been completed, the valve will close securely and tightly so as to effectively prevent the escape of air.

A still further object of the invention is the provision of an all-rubber self-closing valve for bladders, hand balls, or the like, which may be economically manufactured and at the same time be of light weight and will close tightly and securely to prevent the escape of air.

Still another object of the invention is the provision of an all-rubber self-closing inflating valve of the character described, the parts of which will be urged by pressure of the air within the bladder or ball to which the valve is connected to a position to prevent the escape of air, and which will in addition be provided with means to bring about a lateral pressure upon the valve parts to maintain the valve in a tightly closed position.

To these and other ends, the invention consists in the novel features and combinations of parts to be hereinafter described and claimed.

In the drawing:

Fig. 1 is a sectional view of a portion of a ball having therein a bladder provided with our improved valve structure;

Fig. 2 is a view similar to Fig. 1 showing the valve with the nozzle of an inflating pump inserted therein;

Fig. 3 is a side elevational view of the valve body;

Fig. 4 is a bottom plan view of Fig. 3;

Fig. 5 is a sectional view of the valve body;

Fig. 6 is a sectional view on line 6—6 of Fig. 5;

Fig. 7 is a sectional view of a valve body showing a modified form of our invention; and Fig. 8 is a top plan of the valve body shown in Fig. 7.

To illustrate a preferred embodiment of our invention, we have shown in Fig. 1 a valve structure comprising a body portion 10 provided at a point adjacent its upper end with a laterally extending flange 11 which may be secured to the wall of the bladder 12 by any of the usual means, such as cement. Above the flange 11 the body is provided with a projecting neck 13 of reduced diameter as compared with the diameter of the body member 10, the neck 13 being adapted to extend upwardly through an opening in the ball or cover 14. It will be understood that the neck 13 may be made of such length with respect to the thickness of the cover 14 that the outer end of the neck will, if desired, lie flush with the external surface of the cover.

The neck 13 and body 10 are tubular to provide a passageway 15 extending downwardly through the outer surface of the neck to a point adjacent the lower surface of the body. This passageway is of relatively small diameter with respect to the diameter of the body member 10 so as to provide a relatively thick wall in the body member surrounding this passageway. At the lower end of the opening 15, this opening is flared outwardly and downwardly in cone-shaped formation to provide a cone-shaped valve seat 16 thereabove. A valve 17 is provided at the lower end of the body member 10, the upper surface of which is cone shaped to complement the valve seat 16 and fit tightly thereagainst.

The valve member 17 is preferably secured at its edge portion to the body member 10 and may be, and preferably is, formed integrally with the body member 10. As a result of this construction, the flaring opening below the passage 15 will be entirely closed at its lower end except for the provision of one or more openings 18 extending downwardly through the valve member 17 to communicate with the interior of the ball at the lower end and to communicate with the flaring opening between the upper surface of the valve 17 and the valve seat 16. The opening or openings 18 are quite small but serve to admit air to the bladder when the nozzle 19 of an inflating pump is inserted into the passage 15 in the valve body.

Below the valve body is provided a depending tubular portion or skirt 20 also formed of rubber and provided externally with an annular rib or shoulder 21 adjacent the lower portion of the body member 10. Adjacent its lower end, this skirt or tubular member 20 is also provided with an internally projecting annular rib 22.

Before the valve member is secured to the ball, the skirt portion 20 may be doubled outwardly or folded upwardly upon itself from the position shown in Fig. 5 to the position shown in Figs. 1 and 2. In this position the rib 22 will be brought above the external rib 21 so that the skirt portion will be held securely in place and be retained in its folded position. In such position the skirt portion will, due to its elasticity, exert an inward lateral pressure upon the lower end of the body portion of the valve member and will tend to keep the valve in tightly closed position.

In Figs. 7 and 8 of the drawing we have shown a somewhat modified form of our invention which differs from the construction shown in Figs. 1 to 6, inclusive, by the omission of the skirt portion 20 and its associated parts. In some instances it may not be necessary to provide this skirt portion as the pressure of the air within the ball may hold the valve member 17 tightly to its seat 16 and thus close the small opening 18, which will be the only communication between the interior of the ball and the atmosphere. It will be noted that in both forms of the invention the opening 18 is provided in the valve 17 in such a position that its upper end lies below the valve seat 16 so as to provide for the effective closing of this opening when the valve is urged tightly against its seat.

When the valve structure has been secured to the bladder or article to be inflated and the latter has been inserted in the cover, the bladder is inflated by the insertion of the pump nozzle 19 into the passage 15 and the pump operated in the usual manner. After the inflating operation has been completed, the nozzle is withdrawn and the parts, due to their inherent elasticity, return to the position shown in Fig. 1 wherein the upper conical surface of the valve 17 is in tight contact with the conical valve seat 16. As the upper end of the small opening or passage 18 lies below the valve seat 16, this passage will be closed. It will, of course, be understood that the air pressure within the bladder will press upwardly upon the valve 17 forcing it against its seat, and that also the lateral pressure of the air against the body 10 will likewise act to effect this result due to the conical shape of the co-operating surfaces of the valve and valve seat.

In addition, in the modification of our invention in which the skirt 20 is provided, this skirt will, when folded as shown in Figs. 1 and 2, exert a laterally constricting force upon the lower portion of the valve body 10 to urge it inwardly and effect a tight contact of the valve with the valve seat to further insure a tight closing of the upper end of the opening 18.

The extension of the neck 13 upwardly through the opening in the cover 14 serves to locate both valve and bladder with respect to the cover. If desired, the upper surface of the flange 11 may be cemented to the cover to hold the parts in proper relation.

While we have shown and described some preferred embodiments of our invention, it will be understood that it is not to be limited to all of the details shown, but is capable of modification and variation within the spirit of the invention and within the scope of the appended claims.

What we claim is:

1. Valve means for inflatable balls comprising a body member having a passage therein, a cone-shaped valve seat at the lower end of the passage, a correspondingly shaped valve member cooperating with said seat, said valve member having an opening therethrough extending from the surface adjacent the valve seat and communicating with the interior of the ball, and said body member having a depending skirt portion adapted to be folded upwardly over the lower end thereof to urge the valve member against its seat.

2. Valve means for inflatable balls comprising a body member having a passage therein, a cone-shaped valve seat at the lower end of the passage, a correspondingly shaped valve member formed integrally with said body and cooperating with said seat, said valve member having an opening extending from its surface adjacent the valve seat and communicating with the interior of the ball, and said body member having an integrally formed depending skirt portion adapted to be turned upwardly over the lower portion of the body member to exert an inward compressive force thereon.

3. Valve means for inflatable balls comprising a body member having a passage therein, a cone-shaped valve seat at the lower end of the passage, a correspondingly shaped valve member cooperating with said seat, said valve member having an opening therethrough extending from the surface adjacent the valve seat and communicating with the interior of the ball, and said body member being of elastic material and having a depending skirt formed integrally therewith, said skirt having an exterior rib thereon adjacent the lower end of the body member, and a portion of said skirt below said rib being folded upwardly over said rib to exert a compressive force upon said body member and urge the valve to closed position.

4. Valve means for inflatable balls comprising a body member having a passage therein, a cone-shaped valve seat at the lower end of the passage, a correspondingly shaped valve member cooperating with said seat, said valve member having an opening therethrough extending from the surface adjacent the valve seat and communicating with the interior of the ball, said body member having a depending integrally formed skirt portion, an exterior annular rib on said skirt portion adjacent the lower end of the body member, an interior rib on said skirt portion adjacent its lower end, and said skirt portion being folded upwardly upon itself to engage said lower internal rib above the external rib whereby it is retained in folded position to exert a compressive force upon the lower portion of the body member.

5. Valve means for inflatable balls comprising a body member having a passage therein, a cone-shaped valve seat at the lower end of the passage, a correspondingly shaped valve member cooperating with said valve and connected to the body member about its periphery below the seat to there close the communication between the seat and interior of the ball, said valve member having an opening therethrough extending from the surface contacting the valve seat and communicating with the interior of the ball, and means exerting a lateral compressive force on said body member to urge said valve member and valve seat to closed position.

6. Valve means for inflatable balls comprising a body member having a passage therein, a cone-shaped valve seat at the lower end of the passage, a correspondingly shaped valve member formed integrally with said body and cooperating with said seat and joined to the body member about its entire periphery below the valve seat, said valve member having an opening extending from its surface contacting the valve seat and communicating with the interior of the ball, and means exerting a lateral compressive force on the body member to urge said valve member into contact with the valve seat.

7. Valve means for inflatable balls comprising a body member having a passage therein, a cone-shaped valve seat at the lower end of the passage, a correspondingly shaped valve member formed integrally with said body and cooperating with said seat and joined to the body member about its entire periphery below the valve seat, said valve member having an opening extending from its surface contacting the valve seat and communicating with the interior of the ball, and means formed integrally with said body member and surrounding and compressing the lower portion thereof to urge said valve member into contact with the valve seat.

WALLACE W. DE LANEY.
PAUL S. MADSEN.